(12) United States Patent
Nakao et al.

(10) Patent No.: US 6,535,539 B1
(45) Date of Patent: Mar. 18, 2003

(54) EXCIMER LASER DEVICE

(75) Inventors: Kiyoharu Nakao, Isehara (JP); Hisashi Nara, Hiratsuka (JP); Shunsuke Yoshioka, Oyama (JP)

(73) Assignees: Komatsu Ltd., Tokyo (JP); Ebara Corporation, Tokyo (JP)

( * ) Notice: Subject to any disclaimer, the term of this patent is extended or adjusted under 35 U.S.C. 154(b) by 0 days.

(21) Appl. No.: 09/434,055

(22) Filed: Nov. 4, 1999

(30) Foreign Application Priority Data

Nov. 6, 1998 (JP) .......................................... 10-332082

(51) Int. Cl.[7] .................................................. H01S 3/09
(52) U.S. Cl. ............................ 372/69; 372/57; 372/58; 372/87; 372/90
(58) Field of Search .............................. 372/69, 57, 55, 372/58, 87, 90

(56) References Cited

U.S. PATENT DOCUMENTS 4,975,925 A * 12/1990 Derrickson ................... 372/58
5,009,963 A *  4/1991 Ohmi et al. ............... 428/472.1
5,020,070 A *  5/1991 Lombardo .................... 372/65
5,187,716 A *  2/1993 Haruta et al. .................. 372/57
6,215,806 B1 *  4/2001 Ohmi et al. .................... 372/57

FOREIGN PATENT DOCUMENTS

JP          04027179 A  * 1/1992 .................. 372/90

* cited by examiner

*Primary Examiner*—Paul Ip
*Assistant Examiner*—Cornelius H Jackson
(74) *Attorney, Agent, or Firm*—Armstrong, Westerman & Hattori, LLP.

(57) ABSTRACT

An excimer laser device which neither corrodes due to a laser gas nor contaminates the laser gas is provided. For this purpose, in an excimer laser device including a cross flow fan (1) disposed in a chamber (2) for circulating a laser gas, magnetic bearings (12, 12) having outer ring magnet coils (11, 11) and inner ring magnetic substances (10, 10) for rotatably supporting a rotating shaft (9) by magnetic force, and a motor (49) having a stator (47) and a rotor (48) for directly and rotationally driving the cross flow fan (1), the outer ring magnet coils (11, 11), the inner ring magnetic substances (10, 10), the rotor (48), and the stator (47) are respectively housed in shielded spaces shielded from the laser gas.

4 Claims, 8 Drawing Sheets

EXCIMER LASER DEVICE

TECHNICAL FIELD

The present invention relates to an excimer laser device and, in more detail, to a magnetic bearing for supporting a cross flow fan and a motor for driving the cross flow fan.

BACKGROUND ART

FIG. 9 is a partial sectional view of an excimer laser device according to a prior art, and the prior art will be explained below based on FIG. 9.

In FIG. 9, a laser gas which is a medium for oscillating laser light is sealed in the chamber 2 of the excimer laser device. A cross flow fan 1 provided with a blade section 3 having a plurality of blades and a rotating shaft 9 is disposed in a predetermined position in the chamber 2. The cross flow fan 1 circulates the laser gas by giving driving force to the rotating shaft 9 to rotate the blade section 3, thereby guiding the laser gas to a space between discharge electrodes (not illustrated). The laser gas is excited by applying a predetermined high voltage across the discharge electrodes, thus oscillating laser light.

The cross flow fan 1 is rotatably supported at both ends of the rotating shaft 9 thereof by non-contact magnetic bearings 12 and 12 respectively disposed in a bearing housing 7 and a motor housing 8. The magnetic bearings 12 and 12 include inner ring magnetic substances 10 and 10 which are annularly mounted on the outer peripheral face of the rotating shaft 9 and rotate integrally with the rotating shaft 9 and outer ring magnet coils 11 and 11 annularly surrounding the outer peripheries of the inner ring magnetic substances 10 and 10 with predetermined clearances between them respectively. Electric currents are sent to the outer ring magnet coils 11 and 11 by a current introducing means (not illustrated) to attract the inner ring magnetic substances 10 and 10, thereby rotatably supporting the rotating shaft 9 in a non-contact state.

The cross flow fan 1 is driven by a motor 49 disposed in the motor housing 8. The motor 49 includes a rotor 48 annularly mounted on the outer peripheral face of the rotating shaft 9 and a stator 47 annularly surrounding the outer periphery of the rotor 48 with a predetermined clearance between them. The stator 47 is composed of an iron core and a coil, and a rotating magnetic field is generated at the inner peripheral portion thereof by sending an electric current to the coil, thereby rotating the rotor 48 to drive the cross flow fan 1.

In the case, the inner ring magnetic substances 10 and 10, the outer ring magnet coils 11 and 11, and the rotor 48 are commonly composed of ferromagnetic silicon steel plates. When these silicon steel plates or the stator 47 touch the laser gas, they react with fluorine contained in the laser gas, which causes the materials thereof to corrode or causes an impure gas to generate to thereby contaminate the laser gas. Therefore, coatings having corrosion resistance to fluorine such as nickel plating and the like are applied on the surfaces of the silicon steel plates or the stator 47, thus preventing corrosion and generation of the impure gas.

The aforesaid prior art, however, has disadvantages described below.

Specifically, since the inner ring magnetic substances 10 and 10, the outer ring magnet coils 11 and 11, and the rotor 48 are composed of laminated silicon steel plates, the end faces thereof have projections and recesses. Even if coatings are applied on the end faces having such projections and recesses, the coatings sometimes peel off since adhesion of the coatings and the end faces is poor, and hence the silicon steel plates may touch the laser gas. Consequently, silicon and the like contained in the silicon steel plates sometimes react with fluorine, thus causing the silicon steel plates to corrode and causing the generation of an impure gas to thereby contaminate the laser gas.

Since the stator 47 is also composed of a coil, the surface thereof has large projections and recesses. Moreover, since an insulating material is applied on the surface of the coil, a coating sometimes peels off. Therefore, there is the possibility that the coil and the iron core react with fluorine to thereby corrode, or to thereby generate an impure gas, resulting in the contamination of the laser gas.

As described above, the conventional motor 49 and the magnetic bearing 12 are disposed in positions where they directly touch a laser gas having corrosiveness, and coatings having resistance to the laser gas are applied thereon. However, there is a disadvantage that the coatings of the conventional motor 49 and the magnetic bearing 12 are easy to peel off, thereby causing corrosion of the motor and the magnet bearing or contamination of the laser gas to shorten the life of the laser gas.

SUMMARY OF THE INVENTION

In view of the aforesaid disadvantages, an object of the present invention is to provide an excimer laser device provided with a magnetic bearing and a motor which neither corrode due to a laser gas nor contaminate the laser gas.

To attain the above object, a first configuration of an excimer laser device according to the present invention is characterized in that in an excimer laser device including a cross flow fan disposed in a chamber for circulating a laser gas by rotating a blade section around a rotating shaft, magnetic bearings having outer ring magnet coils mounted in the vicinity of both ends of the inner wall of the chamber and inner ring magnetic substances attached to the outer portions of both sides of the blade section of the outer peripheral face of the rotating shaft and facing the inner peripheral faces of the outer ring magnet coils with predetermined spaces between them respectively, for rotatably supporting the rotating shaft by magnetic force generated by the outer ring magnet coils and the inner ring magnetic substances, and a motor having a stator mounted in the vicinity of an end of the inner wall of the chamber and generating a rotating magnetic field at a predetermined frequency which is variable and a rotor attached to the outer peripheral face of the rotating shaft and facing the inner peripheral face of the stator with a predetermined space between them, for rotating the rotor by the rotating magnetic field of the stator to directly and rotationally drive the cross flow fan, the outer ring magnet coils, the inner ring magnetic substances, the rotor, and the stator are respectively housed in shielded spaces shielded from the laser gas.

Alternatively, the configuration is characterized in that the outer ring magnet coils, the inner ring magnetic substances, the rotor, and the stator are each formed by working out of a bulk material, and that coatings having corrosion resistance to the laser gas are applied on the formed surfaces.

According to the above configuration, the outer ring magnet coils, the inner ring magnetic substances, the rotor, and the stator are respectively housed in the shielded spaces shielded from the laser gas, or they are formed by working out of bulk materials and coatings having corrosion resistance to the laser gas are applied on the surfaces thereof. As a result, components which compose the magnetic bearings and the motor never touch the laser gas, whereby they neither corrode nor contaminate the laser gas. Accordingly, failures in the excimer laser device are reduced and the life of the laser gas can be lengthened.

A second configuration of an excimer laser device according to the present invention is characterized in that in an excimer laser device including a cross flow fan disposed in a chamber for circulating a laser gas by rotating a blade section around a rotating shaft, magnetic bearings having outer ring magnet coils mounted in the vicinity of both ends of the inner wall of the chamber and inner ring magnetic substances attached to the outer portions of both sides of the blade section of the outer peripheral face of the rotating shaft and facing the inner peripheral faces of the outer ring magnet coils with predetermined spaces between them respectively, for rotatably supporting the rotating shaft by magnetic force generated by the outer ring magnet coils and the inner ring magnetic substances, and a motor having a stator mounted in the vicinity of an end of the inner wall of the chamber and generating a rotating magnetic field at a predetermined frequency which is variable and a rotor attached to the outer peripheral face of the rotating shaft and facing the inner peripheral face of the stator with a predetermined space between them, for rotating the rotor by the rotating magnetic field of the stator to directly and rotationally drive the cross flow fan, the outer ring magnet coils, the inner ring magnetic substances, and the stator are respectively housed in shielded spaces shielded from the laser gas, and the rotor is formed into a cage shape out of a conductive material, and a coating having corrosion resistance to the laser gas is applied on the formed surface.

Alternatively, in this configuration, the outer ring magnet coils, the inner ring magnetic substances, and the stator are each formed by working out of a bulk material, and coatings having corrosion resistance to the laser gas are applied on the formed surfaces.

According to the above configuration, the outer ring magnet coils, the inner ring magnetic substances, and the stator are shielded from the laser gas similarly to the first configuration, and the rotor is formed into a cage shape and a fluorine-resistant coating is applied on the surface thereof. Thus, the rotor does not need to be polarized, thereby saving time and labor for processing for polarization. Further, it no longer happens that the driving force of the motor weakens due to a decrease in magnetic force of the rotor, whereby constant driving force is always secured. Furthermore, the rotor has a cage shape, thereby reducing the weight and saving electric power for driving the motor.

BEST MODE FOR CARRYING OUT THE INVENTION

Preferred embodiments according to the present invention will be explained in detail below with reference to the attached drawings. Incidentally, in each embodiment, the same numerals and symbols will be given to the same components as those in a figure used for the explanation of the aforesaid prior art and as those in figures used for another embodiment explained prior to the embodiment, thereby omitting repeated explanation.

Figure 1:
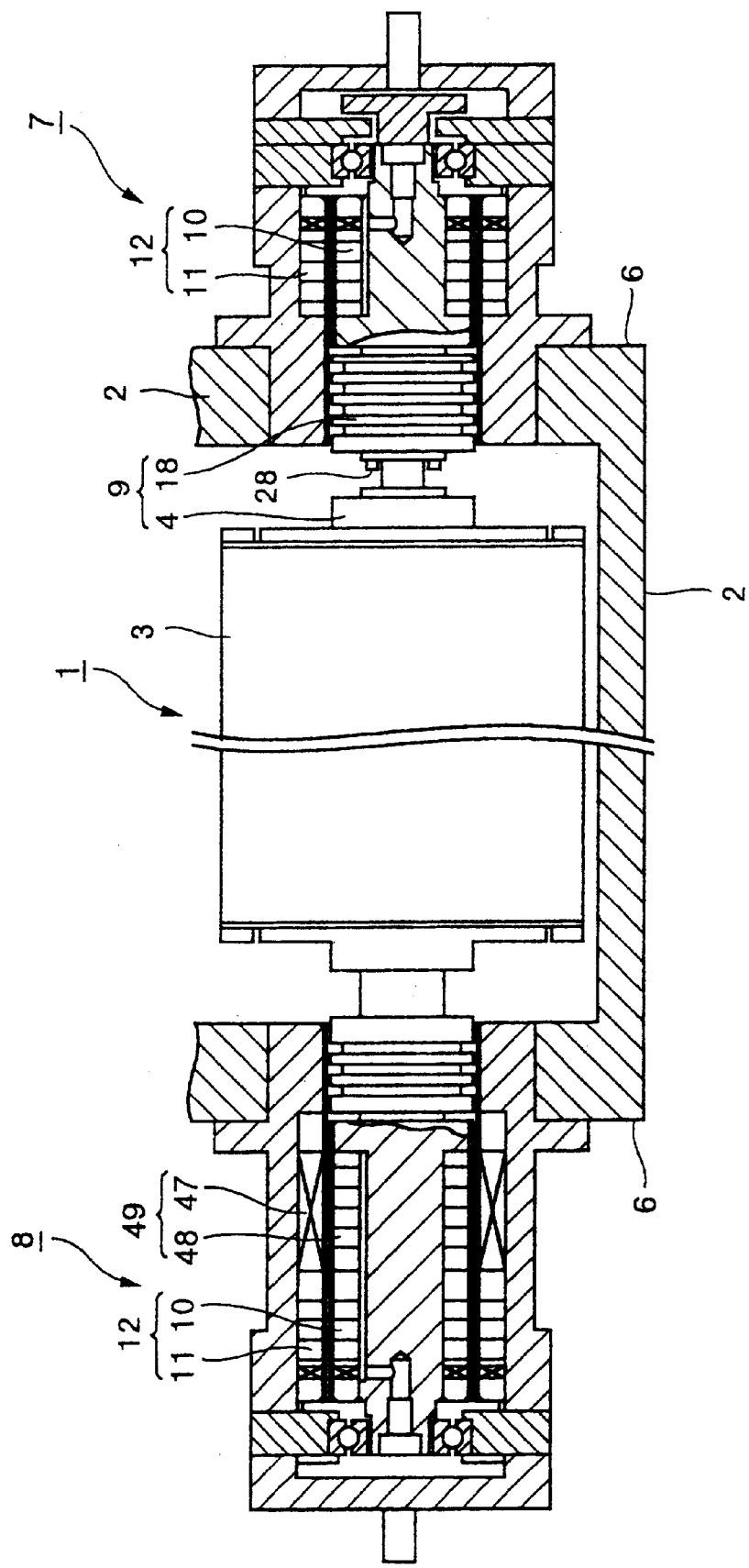
FIG. 1 is a partial sectional view of an excimer laser device according to a first embodiment of the present invention.

First, a first embodiment will be explained based on FIG. 1 to FIG. 3. FIG. 1 is a partial sectional view of an excimer laser device in which a motor 49 and magnetic bearings 12 and 12 according to this embodiment are used.

In FIG. 1, a laser gas is sealed in a chamber 2. A cross flow fan 1 is disposed in a predetermined position in the chamber 2, and the laser gas is circulated by the cross flow fan 1 and sent to a space between discharge electrodes not illustrated. An electric discharge is initiated by applying high voltage across the discharge electrodes, thus exciting the laser gas to oscillate laser light.

The cross flow fan 1 includes a blade section 3 having a plurality of blades for circulating the laser gas and a rotating shaft 9 for rotating the blade section 3. The rotating shaft 9 is divided into two parts at the side of one end of the blade section 3. The rotating shaft 9 is composed of a fan rotating shaft 4 fixed to the blade section 3 and a bearing rotating shaft 18, the axis of rotation of which conforms with that of the fan rotating shaft 4, coupled with an end of the fan rotating shaft 4 with means such as bolts 28 or the like.

The rotating shaft 9 penetrates side walls 6 and 6 on both sides of the chamber 2, and is rotatably supported on both sides of the blade section 3 by the magnetic bearings 12 and 12. These magnetic bearings 12 and 12 include outer ring magnet coils 11 and 11, and inner ring magnetic substances 10 and 10, respectively. The outer ring magnet coils 11 and 11 are respectively mounted on the inner peripheral faces of a nearly cylindrical bearing housing 7 and motor housing 8 respectively attached to the outsides of both the side walls 6 and 6. The inner ring magnetic substances 10 and 10 are annularly mounted on the outer peripheral face of the rotating shaft 9, and rotate integrally with the rotating shaft 9.

The outer peripheral faces of the inner ring magnetic substances 10 and 10 and the inner peripheral faces of the outer ring magnet coils 11 and 11 are provided opposite each other, and electric currents are sent to the outer ring magnet coils 11 and 11 by a current introducing means not illustrated to attract the inner ring magnetic substances 10 and 10. By this attraction, the rotating shaft 9 is rotatably supported in a non-contact state.

The cross flow fan 1 is driven by a motor 49 provided in the motor housing 8. The motor 49 includes a stator 47 mounted on the inner peripheral face. of the motor housing 8 and a rotor 48 annularly mounted on the outer peripheral face of the rotating shaft 9 and rotating integrally with the rotating shaft 9. The inner peripheral face of the stator 47 and the outer peripheral face of the rotor 48 are provided opposite each other, and an electric current is sent to the stator 47 to generate a rotating magnetic field in the inner peripheral portion thereof, thereby rotating the rotor 48 to directly drive the cross flow fan 1.

Figure 2:
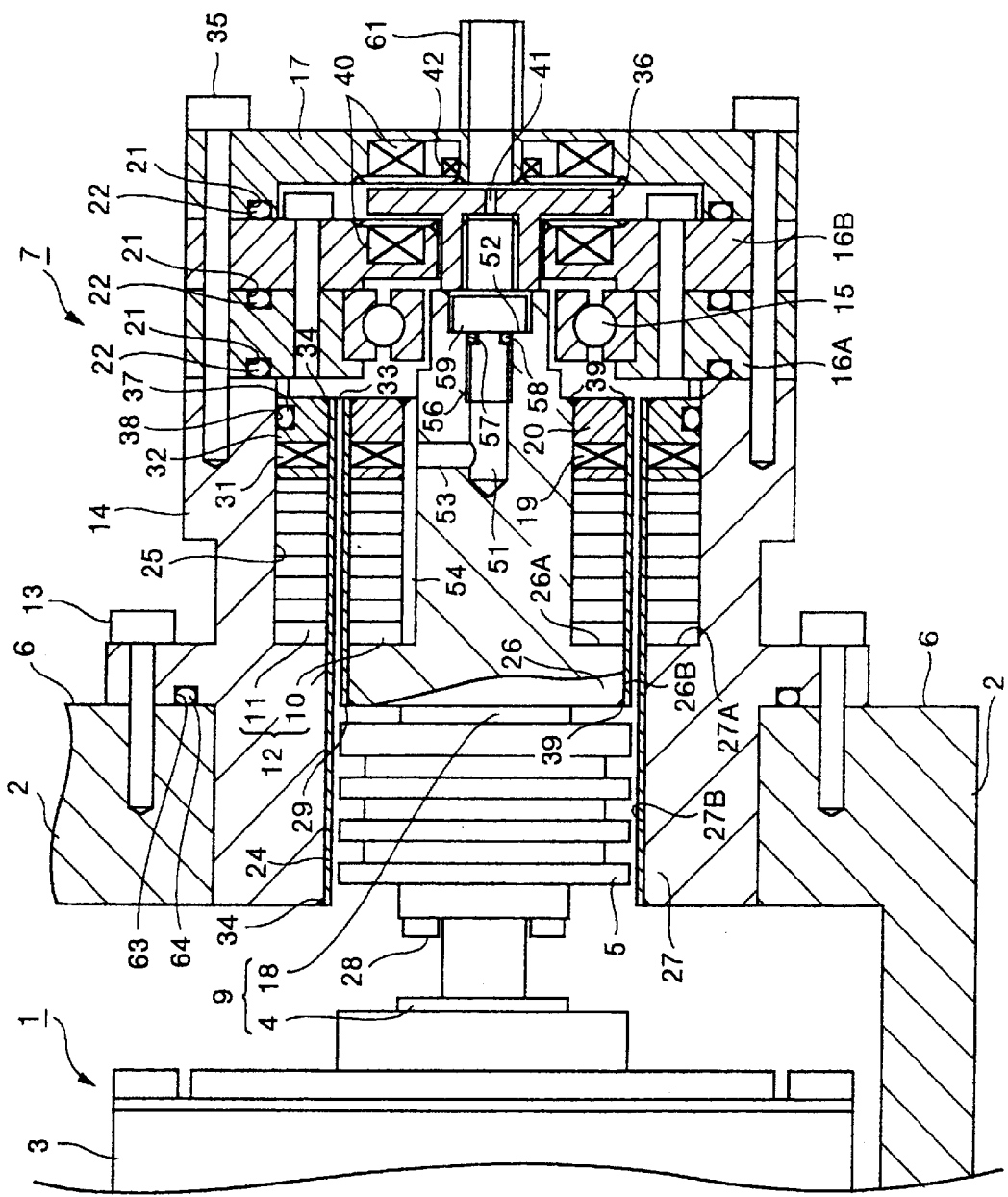
FIG. 2 is a detailed sectional view of the vicinity of a bearing housing in FIG. 1.

FIG. 2 is a detailed sectional view of the vicinity of the bearing housing 7. In FIG. 2, the bearing housing 7 includes a hollow and nearly cylindrical bearing supporting member 14, bearing holders 16A and 16B which hold a touch-down bearing 15 for preventing breakage of the magnetic bearing 12 due to vibration of the rotating shaft 9, and a bearing cap 17 for sealing a space within the bearing housing 7. It is suitable that they are made of materials having corrosion resistance, for example, SUS 316 (JIS code representing one kind of stainless steel).

An inner end of the bearing supporting member 14 is fixed to the side wall 6 of the chamber 2 with a bolt 13. An O-ring groove 63 is provided in a face of the bearing supporting member 14 abutting on the side wall 6, into which an O-ring 64 is fitted to seal in the laser gas.

On the inner peripheral face of the bearing supporting member 14, the hollow cylindrical outer ring magnet coil 11 is pressed in from the right side of FIG. 2 (the outside of the chamber 2) to a position where the outer ring magnet coil 11 abuts on an end face 27A of a housing barrier 27 formed projecting from the inner peripheral face of the bearing supporting member 14. It is suitable that the outer ring magnet coil 11 is formed by laminating hollow disc-shaped silicon steel plates, for example. Such an outer ring magnet coil 11 is molded in an insulating material (not illustrated) such as a synthetic resin or the like, and pressed into the bearing supporting member 14.

On the inner peripheral face of the bearing supporting member 14, a hollow cylindrical bush 32 is also pressed in from the right side of the outer ring magnet coil 11. A gap sensor 31 for detecting without contact a gap between the opposite faces of the inner ring magnetic substance 10 and the outer ring magnet coil 11 of the magnetic bearing 12 is embedded in the inside of the bush 32. The bush 32 is provided with an O-ring groove 38 in its outer peripheral portion, and an O-ring 37 is fitted into the O-ring groove 38 to tightly close a space between the bush 32 and the inner peripheral face of the bearing supporting member 14.

A thin cylindrical outer ring partition 24 is inserted all along from the inner peripheral face of the bush 32 to the inner peripheral face 27B of the housing barrier 27, thus covering the inner peripheral sides of the outer ring magnet coil 11 and the bush 32. A clearance 34 between the outer ring partition 24 and the bush 32 and the bearing supporting member 14, is welded over the entire periphery. This welding allows the bush 32, the outer ring partition 24, and the bearing supporting member 14 to compose a shielded space, which shields the outer ring magnet coil 11 from the laser gas in the chamber 2. Incidentally, metal having corrosion resistance such as SUS 316 is suitable for materials of the bush 32 and the outer ring partition 24.

The hollow cylindrical inner ring magnetic substance 10 made of the same material as that of the outer ring magnet coil 11 is pressed in on the outer peripheral face of the rotating shaft 9 from the right side of FIG. 2 to a position where the inner ring magnetic substance 10 abuts on an end face 26A of a rotating shaft barrier 26 formed projecting from the outer peripheral face of the rotating shaft 9, and faces the outer ring magnet coil 11. A hollow cylindrical bush 20 in which a gap sensor 19 is embedded is also pressed in on the outer peripheral face of the rotating shaft 9 from the right side of the inner ring magnetic substance 10. A thin cylindrical inner ring partition 29 is inserted all along from the outer peripheral face of the bush 20 to the outer peripheral face 26B of the rotating shaft barrier 26, thus covering the outer peripheral sides of the inner ring magnetic substance 10 and the bush 20.

A clearance 39 between the inner ring partition 29 and the bush 20 and the rotating shaft 9, and a clearance 39 between the bush 20 and the rotating shaft 9, are welded over the entire peripheries. This welding allows the bush 20, the inner ring partition 29, and the rotating shaft 9 to compose a shielded space, which shields the inner ring magnetic substance 10 from the laser gas in the chamber 2. Incidentally, metal having corrosion resistance such as SUS 316 or the like is suitable for materials of the bush 20 and the inner ring partition 29.

In this situation, the outer peripheral face of the inner ring partition 29 and the inner peripheral face of the outer ring partition 24 arc opposite each other across a gap 33. As a result, the outer peripheral face of the inner ring magnetic substance 10 and the inner peripheral face of the outer ring magnet coil 11 are opposite each other with a predetermined space between them. An electric current is sent to the outer ring magnet coil 11 by the current introducing means not illustrated to attract the outer peripheral face of the inner ring magnetic substance 10 by electromagnetic force generated in the inner peripheral face of the outer ring magnet coil 11, thereby composing magnetic bearing 12 rotatably supporting the rotating shaft 9 in a non-contact state.

The bearing cap 17, and bearing holders 16A and 16B are fastened from the right side of FIG. 2 to the bearing supporting member 14 together with a bolt 35. O-ring grooves 21 and 21, and an O-ring groove 21 are respectively provided in both the front and rear faces of the bearing holder 16A, and one face of the bearing holder 16B. O-rings 22, 22, and 22, are fitted into the O-ring grooves 21, 21, and 21 to thereby seal in the laser gas within the chamber 2.

The bearing cap 17 is provided with a purge port 61 for poring a clean laser gas.

By the way, the shielded space composed of the bush 20, the inner ring partition 29, and the rotating shaft 9 needs to be shielded against the laser gas. If there is a crack in a weld portion, for example, the laser gas enters through the crack, thus causing the inner ring magnetic substance and the like to corrode. In order to prevent the above situation, a leak checking means for checking the sealing performance of the shield space (which is called a leak check) is provided in the rotating shaft 9.

A leak slot 54 with a predetermined width is provided in the shaft direction on the outer peripheral face of the rotating shaft 9 and in a position where the inner ring magnetic substance 10 is inserted. The leak slot 54 has such an axial length that it does not protrude to the outside of the shielded space.

A leak hole 51 with a predetermined depth provided with a counter-bored hole 52 is provided at one end of the rotating shaft 9 toward the left of FIG. 2. The leak hole 51 has a ground face 57 ground to a predetermined depth from the bottom face of the counter-bored hole 52 and a threaded portion 56 cut at predetermined pitches in a position deeper than the ground face 57 at a side face thereof. A through-hole 53 is provided from the leak slot 54 to the side face of the leak hole 51 in the radial direction of the rotating shaft 9.

The procedure for the leak check will be shown below. First, a joint of a helium leak-detector, for example, is screwed into the threaded portion 56 of the leak hole 51, and the space between the ground face 57 and the joint is sealed with an O-ring. The space is evacuated through the leak hole 51, which makes it possible to check the sealing performance of the shielded space by blowing a helium gas from the outside of the shielded space. These leak slot 54, the leak hole 51, and the through-hole 53 are called the leak checking means.

Subsequently, the joint is removed after the leak check is completed, and a blind plug 59 having an O-ring 58 is screwed into the leak hole 51. The leak hole 51 is sealed with the O-ring 58, thereby shielding the aforesaid shield space from the laser gas.

The shielded space composed of the bush 32, the outer ring partition 24, and the bearing supporting member 14 also needs to be shielded against the laser gas. The leak check for this space can be performed, for example, by providing a leak through-hole (not illustrated) toward the shielded space from the outer peripheral face of the bearing supporting member 14 in the radial direction of the rotating shaft 9 and performing evacuation through the leak through-hole.

Alternatively, a current introducing through-hole (not illustrated) for supplying an electric current to the outer ring magnet coil 11 needs to be provided in the bearing supporting member 14, for example. Therefore, the shielded space may be evacuated through the current introducing through-hole, and then the leak check may be performed.

Incidentally, in the above cases, since the shielded space is shielded from the laser gas although the leak through-hole and the current introducing through-hole communicate with the air outside, the leak through-hole and the current introducing through-hole do not need to be sealed with means such as O-rings or the like.

A rotating disc 36 the inside of which is hollowed out to reduce the weight is fixed to the same one end of the rotating shaft 9 by a fixing means not illustrated. The rotating disc 36 is made of a ferromagnetic material, for example. A gap sensor 42 is embedded in the bearing cap 17 to detect the distance between the rotating disc 36 and the bearing cap 17 and output a signal according to the detected distance.

Electromagnets 40 and 40 are respectively embedded in the bearing cap 17 and the bearing holder 16B. Electric currents are sent to the electromagnets 40 and 40 by a means not illustrated. Namely, the electric currents sent to the electromagnets 40 and 40 are changed respectively based on the output signals from the gap sensor 42 to control the distances between the rotating disc 36 and the bearing cap 17 and the bearing holder 16, by using attraction exerted on the rotating disc 36. Thus, it becomes possible to maintain the axial position of the rotating shaft 9 at a proper position. Incidentally, the rotating disc 36 has a vent through-hole 41 for letting air or the laser gas out of the aforesaid portion hollowed to reduce the weight.

A labyrinth 5 provided with a plurality of grooves is formed on the outer peripheral face of the rotating shaft 9 between the rotating shaft barrier 26 and the blade section 3 to prevent impurities produced in the chamber 2 from entering the bearing housing 7.

Figure 3:
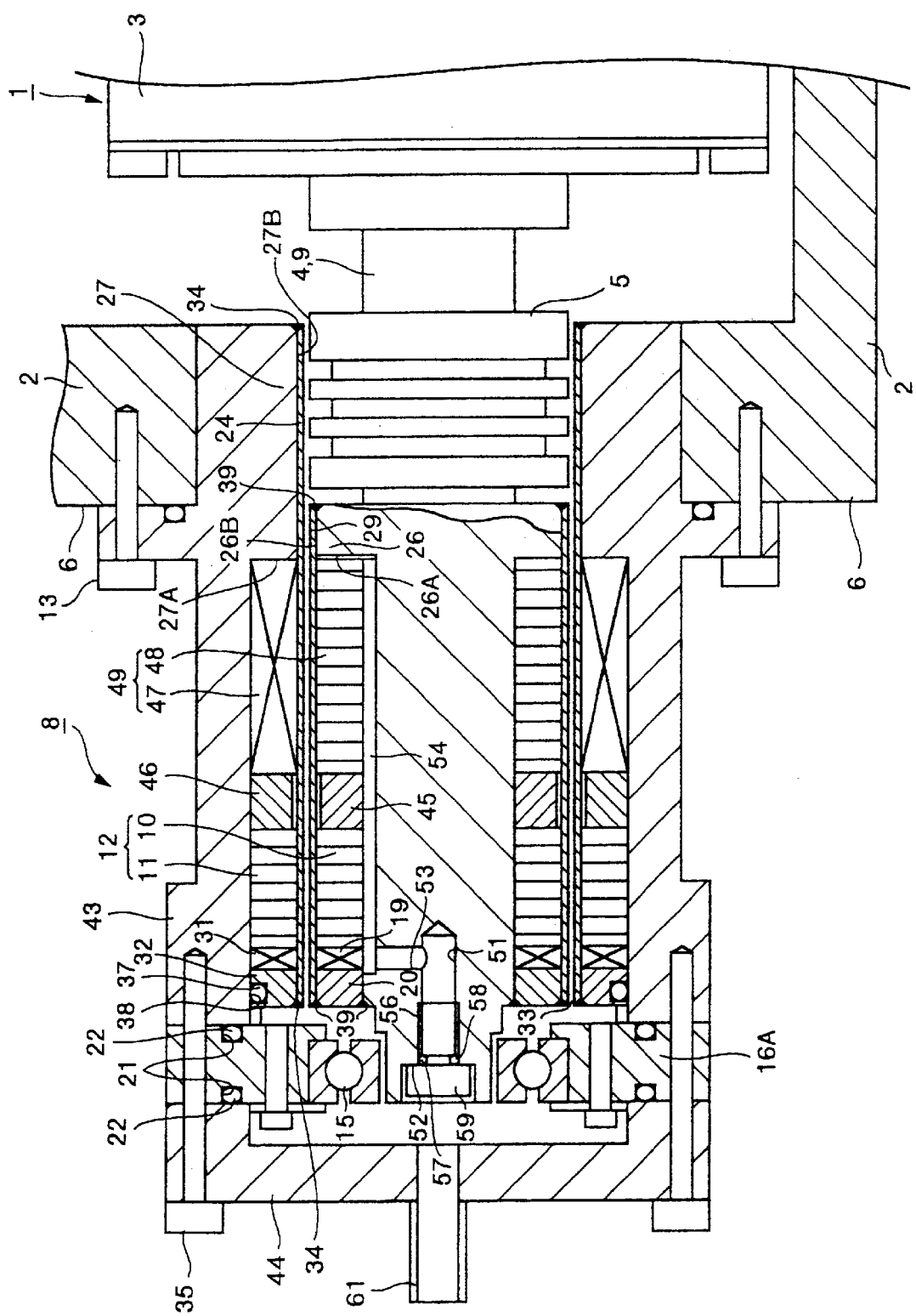
FIG. 3 is a detailed sectional view of the vicinity of a motor housing in FIG. 1.

FIG. 3 is a detailed sectional view of the vicinity of the motor housing 8. The motor housing 8 includes a hollow cylindrical motor supporting member 43, the bearing holder 16A, and a motor cap 44 for sealing up a space within the motor housing 8. It is suitable that they are made of materials having corrosion resistance, for example, SUS 316 or the like.

On the inner peripheral face of the motor supporting member 43, the hollow cylindrical stator 47 is pressed in from the left side of FIG. 3 (the outside of the chamber 2) to a position where the stator 47 abuts on the end face 27A of the housing barrier 27 formed projecting from the inner peripheral face of the motor supporting member 43. The stator 47 is composed of a coil and an iron core, for example, as in the case of a common motor, and molded in an insulating material such as a synthetic resin or the like. It is possible to send an electric current from the outside of the chamber 2 to the coil through a current introducing through-hole not illustrated to thereby generate a rotating magnetic field on the inner peripheral side thereof.

On the inner peripheral face of the motor supporting member 43, a hollow cylindrical bush 46 having a predetermined axial thickness is also pressed in from the left side of the stator 47. Moreover, from the left side of the bush 46, the outer ring magnet coil 11, and the bush 32 having the gap sensor 31 are pressed in. In this situation, the bush 32 is provided with the O-ring groove 38 in its outer peripheral portion, and the O-ring 37 is fitted into the O-ring groove 38 to tightly close a space between the bush 32 and the inner peripheral face of the motor supporting member 43.

Similarly to the bearing housing 7, the thin cylindrical outer ring partition 24 is inserted all along from the inner peripheral face of the bush 32 to the inner peripheral face 27B of the housing barrier 27, thus covering the inner peripheral sides of the outer ring magnet coil 11, the stator 47, and the bush 32.

The clearance 34 between the outer ring partition 24 and the bush 32 and the motor supporting member 43, is welded over the entire periphery. This welding allows the bush 32, the outer ring partition 24, and the motor supporting member 43 to compose a shielded space, which shields the outer ring magnet coil 11 and the stator 47 from the laser gas in the chamber 2. Metal having corrosion resistance such as SUS 316 is suitable for materials of the bush 32 and the outer ring partition 24.

As described above, the current introducing through-hole not illustrated for supplying an electric current to the stator 47 and the outer ring magnet coil 11 is provided in the shielded space which shields the stator 47 and the outer ring magnet coil 11 from the laser gas, and the shielded space communicates with the air outside. The shielded space is evacuated through the current introducing through-hole, thereby enabling the leak check on the shielded space. In this case, since the shielded space is shielded from the laser gas although the current introducing through-hole communicates with the air outside, the current introducing through-hole does not need to be sealed with a means such as an O-ring or the like.

On the outer peripheral face of the rotating shaft 9, the hollow cylindrical rotor 48 formed by laminating silicon steel plates is pressed in from the left side of FIG. 3 to a position where the rotor 48 abuts on the end face 26A of the rotating shaft barrier 26 formed projecting from the outer peripheral face of the rotating shaft 9, and faces the stator 47. A hollow cylindrical bush 45 having a predetermined axial thickness and the inner ring magnetic substance 10 are pressed in from the left side of the rotor 48 in this order. The bush 20 with the gap sensor 19 is also pressed in further from the left side.

The thin cylindrical inner ring partition 29 is inserted all along from the outer peripheral face of the bush 20 to the outer peripheral face 26B of the rotating shaft barrier 26, thus covering the outer peripheral sides of the rotor 48, the inner ring magnetic substance 10, and the bush 20. The clearance 39 between the inner ring partition 29 and the bush 20 and the rotating shaft 9, and the clearance 39 between the bush 20 and the rotating shaft 9, are welded over the entire peripheries. This welding allows the bush 20, the inner ring partition 29, and the rotating shaft 9 to compose a shielded space, which shields the inner ring magnetic substance 10 and the rotor 48 from the laser gas in the chamber 2.

In the above situation, the opposite inner ring magnetic substance 10 and the outer ring magnet coil 11 compose the magnetic bearing 12 as in the case of the bearing housing 7. Metal having corrosion resistance such as SUS 316 or the like is suitable for materials of the bush 20 and the inner ring partition 29.

The motor cap 44 provided with the purge port 61 for poring a clean laser gas and the bearing holder 16A are fastened to the motor supporting member 43 together with the bolt 35 from the left side of FIG. 3. The same leak checking means for performing the leak check on the shielded space is provided at the other end of the rotating shaft 9 similarly to the aforesaid one end thereof. Further, the labyrinth 5 provided with a plurality of grooves is formed on the outer peripheral face of the rotating shaft 9 between the rotating shaft barrier 26 and the blade section 3 to prevent impurities produced in the chamber 2 from entering the motor housing 8.

Figure 4:
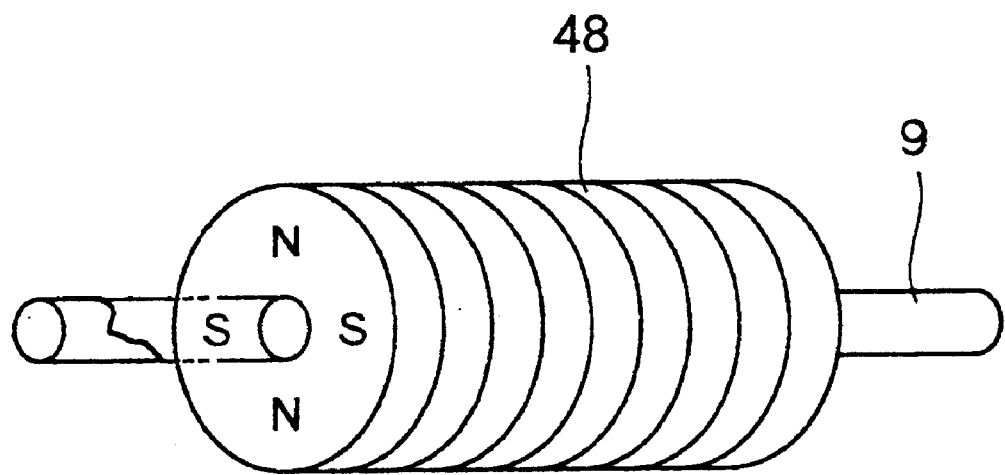
FIG. 4 is a perspective view of a rotor in FIG. 3.

FIG. 4 is a perspective view of the rotor 48. The rotor 48 is polarized so that different magnetic poles are alternately located at even intervals, for example, in four positions on the outer periphery thereof. The stator 47 and the rotor 48 compose the motor 49 (an induction type motor in this case). Therefore, a rotating field is generated by sending an electric current to the coil of the stator 47, which permits the rotor 48 to rotate. In this case, the rotor 48 may be polarized so that magnetic poles are located in two positions, or in more than four positions. The blade section 3 of the cross flow fan 1 is rotated with the rotation of the rotor 48 as driving force to thereby circulate the laser gas.

As explained above, according to this embodiment, the inner ring partition 29 is provided on the outer peripheral portions of the inner ring magnetic substances 10 and 10, and the rotor 48 to form the shielded spaces, thus shielding the inner ring magnetic substances 10 and 10, and the rotor 48 from the laser gas. Further, the outer ring partition 24 is provided on the inner peripheral portions of the outer ring magnet coils 11 and 11, and the stator 47 to form the shielded spaces, thereby shielding them from the laser gas in the same way as above. Thus, the inner ring magnetic substances 10 and 10, the outer ring magnet coils 11 and 11, the rotor 48, and the stator 47 do not touch the laser gas, whereby they neither corrode nor generate an impure gas, thus reducing failures in the excimer laser and lengthening the life of the laser gas.

Furthermore, the leak checking means for the leak check on the shielded spaces housing the inner ring magnetic substances 10 and 10, the outer ring magnet coils 11 and 11, the rotor 48, and the stator 47 are provided. Therefore, leakage from the shielded spaces is previously checked by the means. When a leak is found, this leak can be stopped, thus more certainly preventing the laser gas from entering the shielded spaces. As a result, failures in the excimer laser can be reduced and the life of the laser gas can be lengthened.

Figure 5:
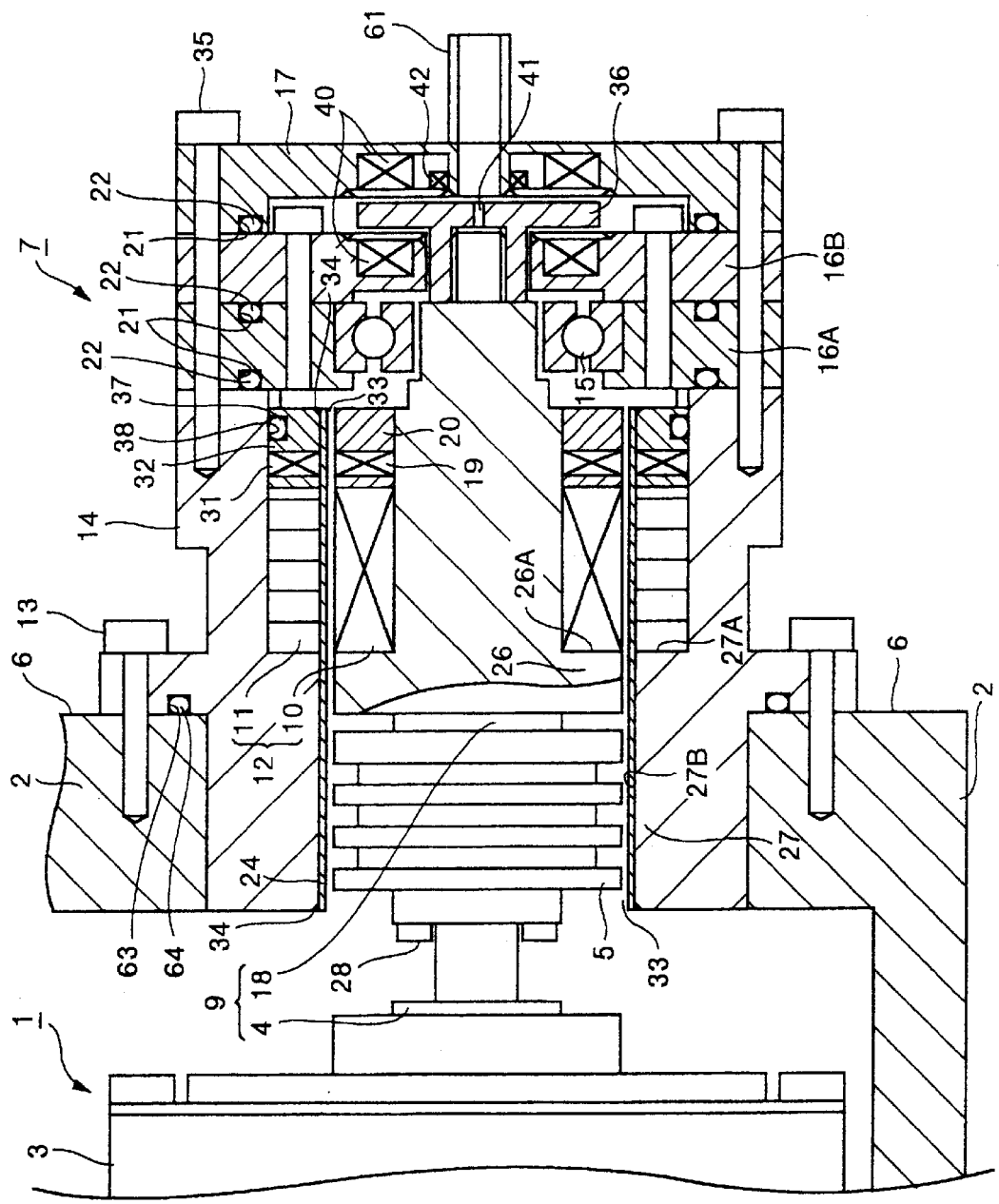
FIG. 5 is a detailed sectional view of the vicinity of a bearing housing of an excimer laser device according to a second embodiment of the present invention.

Next, a second embodiment will be explained based on FIG. 5 to FIG. 8. FIG. 5 is a detailed sectional view of the vicinity of the bearing housing 7 of an excimer laser device according to this embodiment. In FIG. 5, on the inner peripheral face of the bearing supporting member 14 of the bearing housing 7, the outer ring magnet coil 11 and the bush 32 are pressed in similarly to the first embodiment. The thin cylindrical outer ring partition 24 is inserted all along from the inner peripheral face of the bush 32 to the inner peripheral face 27B of the housing barrier 27, thus covering the inner peripheral sides of the outer ring magnet coil 11 and the bush 32. The clearance 34 between the outer ring partition 24 and the bush 32 and the bearing supporting member 14, is welded over the entire periphery.

Further, similarly to the first embodiment, the bearing cap 17 is attached integrally with the bearing holder 16A including the O-ring grooves 21 and 21 by the bolt 35, thereby sealing the laser gas inside the bearing housing 7.

Meanwhile, on the outer peripheral face of the rotating shaft 9, the hollow cylindrical inner ring magnetic substance 10 made of ferromagnetic metal is pressed in from the right side of FIG. 5 (the outside of the chamber 2) to a position where the inner ring magnetic substance 10 abuts on the end face 26A of the rotating shaft barrier 26. The inner ring magnetic substance 10 is obtained by working ferromagnetic metal into a cylindrical shape provided with a through-hole in the center thereof from a bulk material (a solid material) by cutting or the like. The bush 20 into which the gap sensor 19 is embedded is pressed in from the right side of the inner ring magnetic substance 10.

In this situation, the outer peripheral face of the inner ring magnetic substance 10 and the inner peripheral face of the outer ring magnet coil 11 compose the magnetic bearing 12 rotatably supposing the rotating shaft 9 in a non-contact state. An Fe—Ni series magnetic alloy including 35% to 80% of nickel, for example, is suitable for the ferromagnetic metal as the material of the inner ring magnetic substance 10, and PB, PC, PCS, PD, PE, and the like of JIS are available. A fluorine-resistant coating such as nickel plating is applied on the surface of the inner ring magnetic substance so that the ferromagnetic metal does not directly touch the laser gas.

Figure 6:
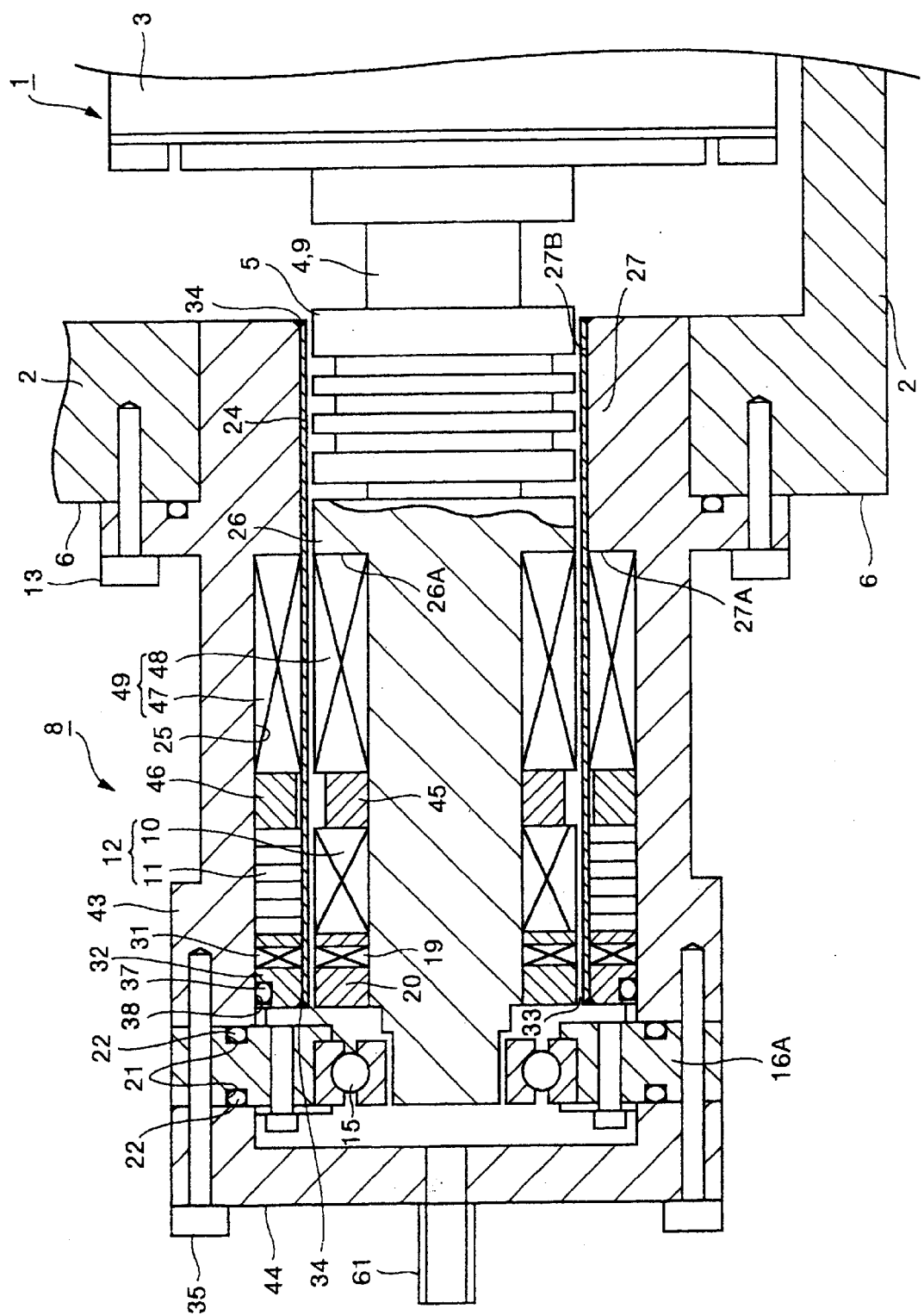
FIG. 6 is a detailed sectional view of the vicinity of a motor housing in the second embodiment.

FIG. 6 is a detailed sectional view of the vicinity of the motor housing 8. In FIG. 6, as with the first embodiment, on the inner peripheral face of the motor supporting member 43, the stator 47, the bush 46, the outer ring magnet coil 11, and the bush 32 in which the gap sensor 31 is embedded are pressed in from the outside of the chamber 2 (the left side of FIG. 6) in this order. Similarly, the thin hollow cylindrical outer ring partition 24 for covering the inner peripheral sides of the outer ring magnetic coil 11, the stator 47, and the bush 32 is inserted, and the clearance 34 is welded over the entire periphery, thus forming a shielded space.

The motor cap 44 is fastened integrally with the bearing holder 16A having the O-ring grooves 21 and 21 to the motor supporting member 43 with the bolt 35, thereby sealing the laser gas inside the motor housing 8, which is similar to the first embodiment.

On the outer peripheral face of the rotating shaft 9, the columnar rotor 48 provided with a through-hole in the center thereof, which is obtained by cutting ferromagnetic metal from a bulk material, is pressed in from the left side of FIG. 6. Further, the hollow cylindrical bush 45 with a predetermined axial thickness, the inner ring magnetic substance 10 which is the same as that on the bearing housing 7 side, and the bush 20 having the gap sensor 19 are pressed in from the left side of the rotor 48 in this order.

In this situation, the rotor 48 is polarized to have magnetic poles in four positions as shown in FIG. 4, for example, and a fluorine-resistant coating is applied on the surface thereof. In this case, the rotor 48 may be polarized so that magnetic poles are located in two positions, or in more than four positions. The rotor 48 which has undergone the predetermined processing for polarization as described above and the inner ring magnetic substance 10 face the stator 47 and the outer ring magnet coil 11 respectively to compose the motor 49 (a synchronous type motor in this case) for driving the cross flow fan 1 and the magnetic bearing 12 for supporting the rotating shaft 9.

Figure 7:
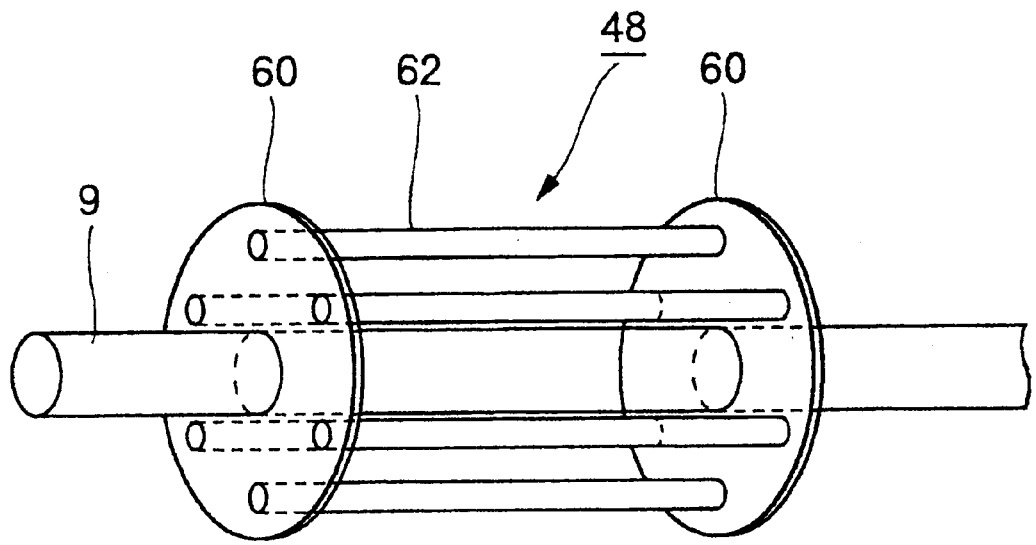
FIG. 7 is a perspective view showing another configurational example of a rotor in the second embodiment.
Figure 8:
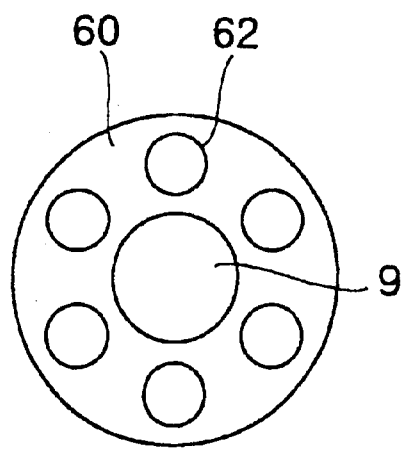
FIG. 8 is a side view of the rotor in FIG. 7.
Figure 9:
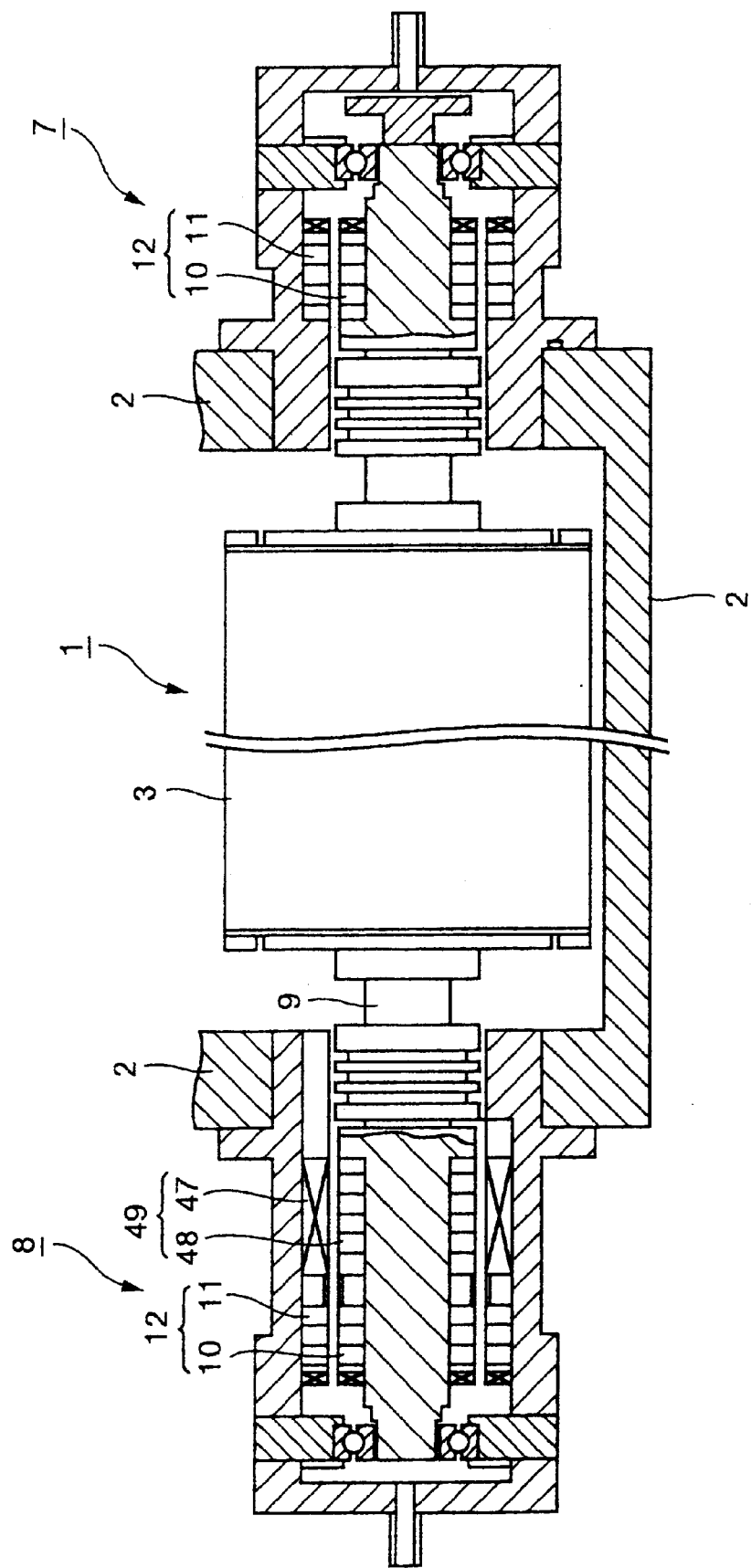
FIG. 9 is a partial sectional view of an excimer laser device according to a prior art.

FIG. 7 and FIG. 8 show other configurational examples of the rotor 48 in the second embodiment. FIG. 7 is a perspective view of the rotor 48, and FIG. 8 is a side view thereof. In FIGS. 7 and 8, the rotor 48 includes two circular plates 60 and 60 each having a circular through-hole in the center thereof and almost vertically put into the rotating shaft 9, and columns 62 near the outer peripheries of the circular plates 60 and 60, laid between the circulate plates 60 and 60 and surrounding the rotating shaft 9 at even intervals, almost parallel to the rotating shaft 9. The rotor 48 has a so-called cage shape. The number of columns 62 is six, for example.

The above cage-shaped rotor 48 is made of a conductive material such as aluminum, and a coating such as nickel plating is applied on the surface thereof. The motor 49 is an induction type motor. Incidentally, the number of the columns 62 is not limited to six. Four columns or more than six columns are also suitable. In addition, the column 62 may have a hollow cylindrical shape.

As explained above, according to this embodiment, the inner ring magnetic substance 10 of the magnetic bearing 12 and the rotor 48 of the motor 49 are worked out of the bulk material of ferromagnetic metal by working means such as cutting and the like, and corrosion-resistant coatings such as nickel plating are applied on the surfaces thereof. Alternatively, the rotor 48 is formed of inductive material such as aluminum into a cage shape, and a coating is applied on the surface thereof, thus obtaining a squirrel-cage induction motor.

Consequently, the inner ring magnetic substance 10 and the rotor 48 do not have the structure in which silicon steel plates are laminated, and insulating materials do not adhere to them, thus improving adhesion of coatings and the inner ring magnetic substance 10 and the rotor 48, whereby the coatings do not easily peel off the surfaces thereof. Accordingly, fluorine does not directly touch the inner ring magnetic substance 10 and the rotor 48, and the generation of an impure gas from the surfaces thereof reduces, which makes it possible to lengthen the life of the laser gas.

The coatings of the inner magnetic substance 10 and the rotor 48 become difficult to peel off, which allows the surfaces of the inner ring magnetic substance 10 and the rotor 48 to be shielded from the laser gas only by the coatings, thus making the inner ring partition 29 unnecessary. As a result, the respective spaces between the facing inner ring magnetic substances 10 and 10 and outer ring magnet coils 11 and 11 of the magnetic bearings 12 and 12 can be narrowed, and the inner ring partition 29 blocking off electromagnetic force of the outer ring magnet coils 11 and 11 is eliminated, whereby attraction caused by electromagnetic force of the outer ring magnet coils 11 and 11 is strengthened, and the withstand load performance and vibration-resisting property of the magnetic bearing 12 are improved.

Further, as the result of the elimination of the inner ring partition 29, the intensity of a rotating magnetic field exerted on the rotor 48 by the stator 47 of the motor 49 increases, thus improving driving force of the motor 49, which enables the cross flow fan 1 to efficiently rotate. Since the rotor 48 is formed into a cage shape, the rotor 48 is reduced in weight, which makes it possible to more efficiently rotate the cross flow fan 1. If aluminum is used as the material of the rotor 48, the reduction in weight is promoted, which is more suitable.

Furthermore, as the result of the elimination of the inner ring partition 29, welding of the clearance 39 becomes unnecessary, thus simplifying the configuration of the rotating shaft 9 and lowering manufacturing costs. Besides, the leak check on the weld portion becomes unnecessary, thereby saving time and labor for the leak check. Moreover, the leak checking means for the leak check becomes needless, thus simplifying the configuration of the rotating shaft 9.

In the present invention, the main object thereof is that the inner ring magnetic substances 10 and 10, the outer ring magnet coils 11 and 11, the rotor 48, and the stator 47 do not touch the laser gas. Therefore, means for realizing the object are not limited to combinations explained in the first and second embodiments.

Specifically, the inner ring magnetic substances 10 and 10 and the outer ring magnet coils 11 and 11 are housed in shielded spaces, or they may be formed of bulk materials and coatings may be applied on the surfaces thereof. The rotor 48 is housed in a shielded space, or it may be formed of a bulk material and a coating may be applied on the surface thereof, or it may be formed of a conductive material into a cage shape and a coating may be applied on the surface thereof. As for the stator 47, it is required to be housed in a shielded space. The present invention can be realized by combining the above configurations as required.

In the first embodiment, the inner ring magnetic substances 10 and 10, the outer ring magnet coils 11 and 11, and the rotor 48 may be formed of bulk materials, and coatings may be applied on the surfaces thereof. Consequently, even a laser gas enters the shielded spaces, these components never directly touch the laser gas, thus making it possible to more certainly shield these components from the laser gas.

The rotating shaft 9 has a configuration in which the fan rotating shaft 4 and the bearing rotating shaft 18 are coupled, but the one-piece rotating shaft 9, and the rotating shaft 9 divided at a different position, for example, are also suitable. Moreover, the number of the magnetic bearings 12 and 12 supporting the rotating shaft 9 is not limited to two, and more than three magnetic bearings are also suitable.

The magnetic bearing 12 is composed of the inner ring magnetic substance 10 and the outer ring magnet coil 11. However, either or both of them, for example, may be magnets such as permanent coils, electromagnets, or the like. Moreover, the magnet bearing 12, in which magnets are used for both the inner ring magnetic substance 10 and the outer ring magnet coil 11, the opposite faces of them have the same magnetic poles, and repulsion of these magnetic poles is used, is also suitable.

What is claimed is:

1. A gas laser device including a halogen gas including
   a cross flow fan disposed in a chamber for circulating a laser gas by rotating a blade section around a rotation shaft,
   magnetic bearings having outer ring magnet coils mounted in the vicinity of both ends of the inner wall of said chamber and inner ring magnetic substances attached to the outer portions of both sides of said blade section of the outer peripheral face of said rotating shaft and facing the inner peripheral faces of said outer ring magnet coils with predetermined spaces between them respectively, for rotatably supporting said rotating shaft by magnetic force generated by said outer ring magnet coils and said inner ring magnetic substances,
   a motor having a stator mounted in the vicinity of an end of the inner wall of said chamber and generating a rotating magnetic field at a predetermined frequency which is variable and a rotor attached to the outer peripheral face of said rotating shaft and facing the inner peripheral face of said stator with a predetermined space between them, for rotating said rotor by the rotating magnetic field of said stator to directly and rotationally drive said cross flow fan, a thin cylindrical outer ring partition which is a separate member from said outer ring magnet coils and said stator and is of a material non-corrosive to the laser gas, extending in a continuous manner at a location intermediate said outer ring magnet coils and said stator, and said inner ring magnetic substances and said rotor respectively, to prevent contact of said laser gas with said outer ring magnet coils and said stator, and a thin cylindrical inner ring partition which is a separate member from said inner ring magnetic substance and said rotor and is of a material non-corrosive to the laser gas, extending in a continuous manner at a location intermediate said inner ring magnetic substances and said rotor, and said outer ring magnet coils and said stator respectively, to prevent contact of said laser gas with said inner ring magnetic substances and said rotor.

2. A gas laser device including a halogen gas including a cross flow fan disposed in a chamber for circulating a laser gas by rotating a blade section around a rotating shaft, magnetic bearings having outer ring magnet coils mounted in the vicinity of both ends of the inner wall of said chamber and inner ring magnetic substances attached to the outer portions of both sides of said blade section of the outer peripheral face of said rotating shaft and facing the inner peripheral faces of said outer ring magnet coils with predetermined spaces between them respectively, for rotatably supporting said rotating shaft by magnetic force generated by said outer ring magnet coils and said inner ring magnetic substances, and a motor having a stator mounted in the vicinity of an end of the inner wall of said chamber and generating a rotating magnetic field at a predetermined frequency which is variable and a rotor attached to the outer peripheral face of said rotating shaft and facing the inner peripheral face of said stator with a predetermined space between them, for rotating said rotor by the rotating magnetic field of said stator to directly and rotationally drive said cross flow fan, wherein said outer ring magnet coils, said inner ring magnetic substances, said rotor, and said stator are each formed of a bulk Fe—Ni series magnetic alloy material, and coatings having corrosion resistance to the laser gas are applied on formed surfaces of said bulk material.

3. A gas laser device including a halogen gas including a cross flow fan disposed in a chamber for circulating a laser gas by rotating a blade section around a rotating shaft, magnetic bearings having outer ring magnet coils mounted in the vicinity of both ends of the inner wall of said chamber and inner ring magnetic substances attached to the outer portions of both sides of said blade section of the outer peripheral face of said rotating shaft and facing the inner peripheral faces of said ring magnet coils with predetermined spaces between them respectively, for rotatably supporting said rotating shaft by magnetic force generated by said outer ring magnet coils and said inner ring magnetic substances, and a motor having a stator mounted in the vicinity of an end of the inner wall of said chamber and generating a rotating magnetic field at a predetermined frequency which is variable and a rotor attached to the outer peripheral face of said rotating shaft and facing the inner peripheral face of said stator with a predetermined space between them, for rotating said rotor by the rotating magnetic field of said stator to directly and rotationally drive said cross flow fan, wherein:

said outer ring magnet coils, and said stator are housed in shielded spaces shielded from the laser gas by a thin cylindrical ring partition which is a separate member from said outer ring magnet coils, and said stator, and is a material non-corrosive to the laser gas, extending in a continuous manner at a location intermediate said outer ring magnet coils and said inner ring magnetic substances, said inner ring magnetic substances are each formed of a bulk Fe—Ni series magnetic alloy material, and coatings having corrosion resistance to the laser gas are applied on formed surfaces of said bulk material, and said rotor is formed into a cage shape out of a conductive material, and a coating having corrosion resistance to a laser gas is applied on the surface of said cage shaped rotor.

4. A gas laser device including a halogen gas including a cross flow fan disposed in a chamber for circulating a laser gas by rotating a blade section around a rotation shaft, magnetic bearings having outer ring magnet coils mounted in the vicinity of both ends of the inner wall of said chamber and inner ring magnetic substances attached to the outer portions of both sides of said blade section of the outer peripheral faces of said rotating shaft and facing the inner peripheral faces of said outer ring magnet coils with predetermined spaces between them respectively, for rotatably supporting said rotating shaft by magnetic force generated by said outer ring magnet coils and said inner ring magnetic substances, and a motor having a stator mounted in the vicinity of an end of the inner wall of said chamber and generating a rotating magnetic field at a predetermined frequency which is variable and a rotor attached to the outer peripheral face of said rotating shaft and facing the inner peripheral face of said stator with a predetermined space between them, for rotating said rotor by the rotating magnetic field of said stator to directly and rotationally drive said cross flow fan, wherein said outer ring magnet coils, said inner ring magnetic substances, and said stator are formed of a bulk Fe—Ni series magnetic alloy material, and coatings having corrosion resistance to a laser gas are applied on formed surfaces of said bulk material, and wherein said rotor is formed into a cage shape out of a conductive material, and a coating having corrosion resistance to a laser gas is applied on said formed surface.

* * * * *